United States Patent
Nakamura

(10) Patent No.: US 8,705,083 B2
(45) Date of Patent: Apr. 22, 2014

(54) IMAGE PROCESSING APPARATUS FOR PRINTING MEDIA DISC LABELS BASED ON SCENE DURATIONS

(75) Inventor: Sho Nakamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 755 days.

(21) Appl. No.: 12/431,354

(22) Filed: Apr. 28, 2009

(65) Prior Publication Data

US 2009/0279132 A1 Nov. 12, 2009

(30) Foreign Application Priority Data

May 7, 2008 (JP) .................. 2008-121473

(51) Int. Cl.
*G06F 3/12* (2006.01)

(52) U.S. Cl.
USPC ........... 358/1.15; 345/619; 382/232; 715/246

(58) Field of Classification Search
USPC .................. 358/1.15; 101/486; 345/473, 619; 382/232; 455/185.1, 456.6; 715/246, 715/716, 723
See application file for complete search history.

(56) References Cited

U.S. PATENT DOCUMENTS

| 5,927,208 | A | * | 7/1999 | Hagstrom et al. | ............ 101/486 |
| 2002/0054070 | A1 | * | 5/2002 | Otsuka et al. | ................. 345/723 |
| 2004/0056881 | A1 | * | 3/2004 | Nagatani et al. | ............... 345/716 |
| 2004/0263533 | A1 | * | 12/2004 | Yamamoto et al. | .......... 345/619 |
| 2005/0183010 | A1 | | 8/2005 | Iwasaki | .......................... 715/517 |
| 2007/0127048 | A1 | | 6/2007 | Minami | ....................... 358/1.12 |
| 2008/0114764 | A1 | * | 5/2008 | Choi | ................................ 707/7 |
| 2009/0111487 | A1 | * | 4/2009 | Scheibe | ..................... 455/456.6 |

FOREIGN PATENT DOCUMENTS

| JP | 2695415 | | 9/1987 | |
| JP | 2001-54055 | | 2/2001 | |
| JP | 2001054055 A | * | 2/2001 | ............... H04N 5/91 |

* cited by examiner

*Primary Examiner* — King Poon
*Assistant Examiner* — David S. Cammack
(74) *Attorney, Agent, or Firm* — Fitzpatrick, Cella, Harper & Scinto

(57) ABSTRACT

A plurality of scenes included in moving image data stored in a storage medium are detected, still images included in at least two scenes among the plurality of detected scenes are extracted, and images including the extracted still images are printed on the storage medium. The printed images include the plurality of extracted still images in areas corresponding to time periods of the corresponding scenes. As a result, the content of each scene constituting the moving images recorded in a CD or a DVD and a reproducing time period of the scene can be easily figured out by looking at a result printed on the label of the CD or the DVD.

18 Claims, 5 Drawing Sheets

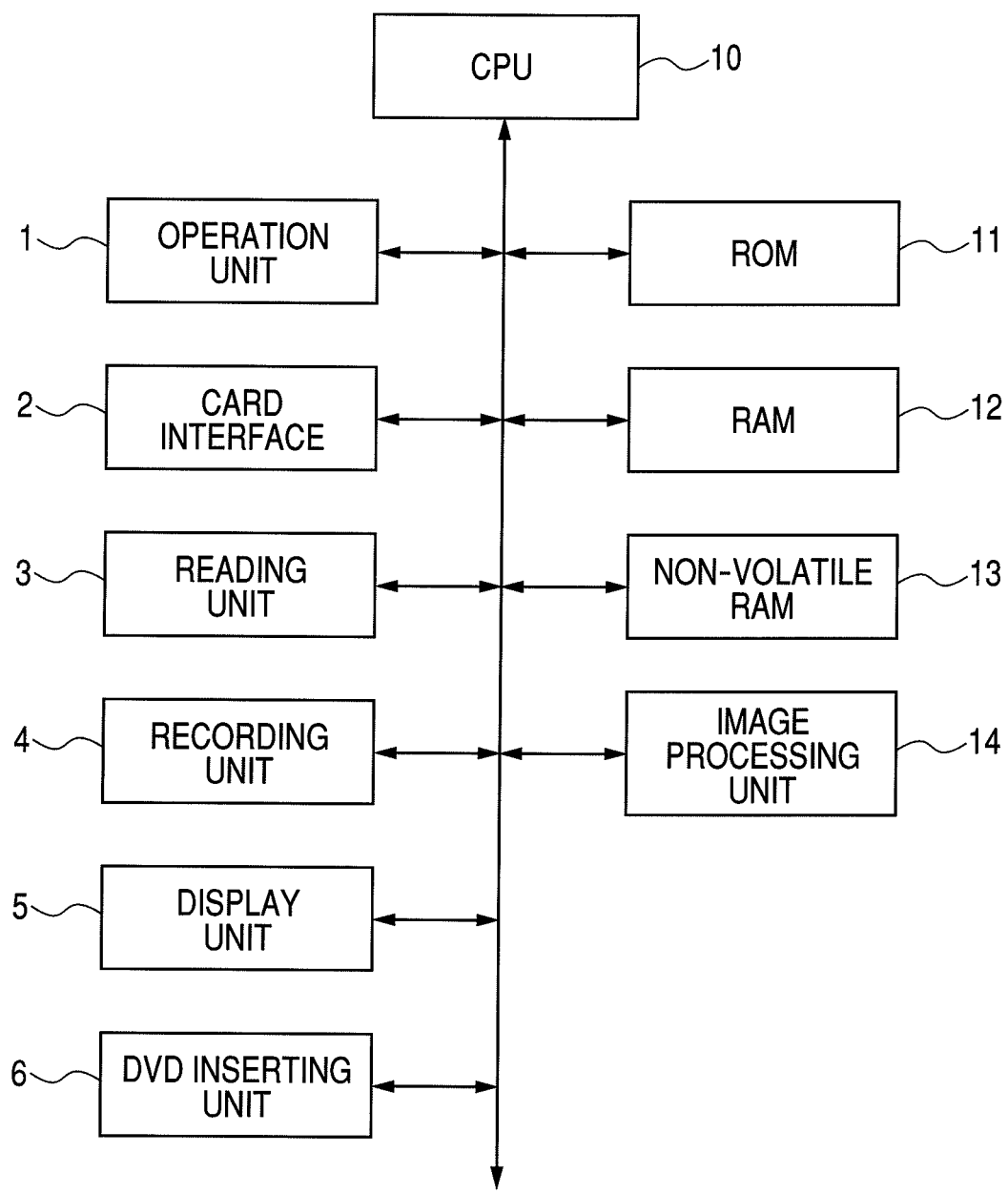

FIG. 5
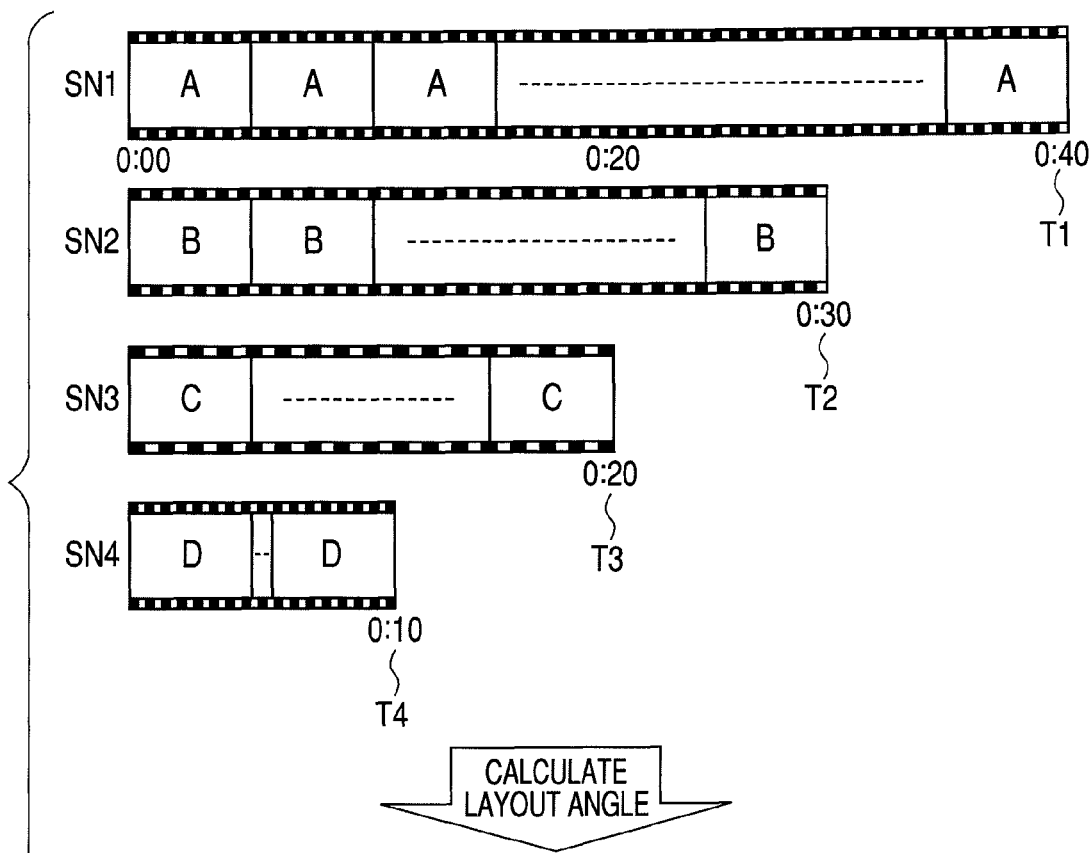
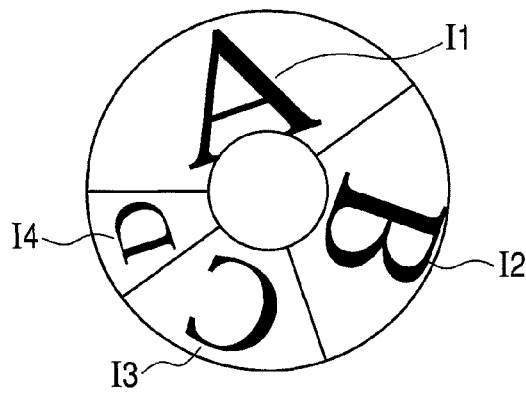

IMAGE PROCESSING APPARATUS FOR PRINTING MEDIA DISC LABELS BASED ON SCENE DURATIONS

BACKGROUND OF THE INVENTION

1. Field of the Invention

The present invention relates to a layout determination method for detecting a scene from a moving image file recorded in a recording medium, determining a representative image from the detected scene, and printing the determined representative image.

2. Description of the Related Art

In recent years, a PC and the like can record moving images taken by a digital video camera in a recording medium such as a memory card and a DVD. Printing of the content of the moving images recorded in a recording medium is widely performed to figure out the content of the moving images recorded in the recording medium. For example, U.S. Patent Application Publication No. 2007-0127048 describes a method of printing the content of moving images on the surface (hereinafter referred to as "label") of a CD or a DVD. According to the description, image data including information indicating the content of data is generated from the data recorded in the CD or the DVD, and the image data is printed on the label of the CD or the DVD. In this way, the user can easily figure out what kind of data is stored.

Japanese Patent Application Laid-Open No. 2001-054055 describes another method for figuring out the content of moving images. In the method, scenes in moving image data are detected, and representative images of the scenes are displayed or printed. According to the description, scenes are prioritized after the detection of the scenes from the moving images, representative scenes are extracted from scenes in higher priority, and representative images of the extracted representative scenes are displayed or printed. In this way, the time for display and printing can be reduced and the user can easily figure out the content of the moving images, because even if many scenes are detected from the moving images as unnecessary images are deleted.

Furthermore, U.S. Patent Application Publication No. 2005-0183010 proposes a method for laying out according to the priority of the data when data is printed on a non-rectangular area such as a label. According to the description, types and forms of the data are analyzed, thereby allowing to automatically lay out on various areas.

However, in the conventional examples, information related to the reproducing time period or the file size of each scene is not visualized on the CD or the DVD recording the moving images. For example, in the technique described in U.S. Patent Application Publication No. 2007-0127048, scenes constituting the moving images are not detected, and only one representative image in the entire moving images is printed. Therefore, it is difficult to figure out a plurality of scenes constituting the moving images by looking at the printing result.

In the technique described in Japanese Patent Application Laid-Open No. 2001-054055, a plurality of scenes constituting the moving images can be figured out by looking at the printing result. However, it is difficult to intuitively understand the proportion of the recording time period of each scene.

In the technique described in U.S. Patent Application Publication No. 2005-0183010, it is difficult to intuitively understand the proportion of the recording time period of each scene just by looking at the printing result when the data is laid out on a non-rectangular area.

SUMMARY OF THE INVENTION

An object of the present invention is to provide an image processing apparatus that prints an image on a storage medium so that a summary of moving images recorded in a circular storage medium, such as a CD and a DVD, can be easily figured out. Another object of the present invention is to provide a method of controlling the following image processing apparatus.

The method of controlling an image processing apparatus that comprises a mounting unit for mounting a circular storage medium and that outputs data to a printing apparatus to print an image on the circular storage medium, the control method comprises: extracting still images included in at least two scenes among a plurality of detected scenes, the scenes being included in moving image data stored in the storage medium mounted on the mounting unit; and outputting data corresponding to images including the still images extracted in the extracting to the printing apparatus, wherein images corresponding to the data output in the outputting include the plurality of still images extracted with the extracting in areas corresponding to time periods of the scenes corresponding to the still images.

Further features of the present invention will become apparent from the following description of exemplary embodiments with reference to the attached drawings.

BRIEF DESCRIPTION OF THE DRAWINGS

FIG. 2 is a block diagram of a configuration of the MFP 100.

FIG. 5 depicts an example of laying out representative images of the scenes on the label of the DVD 7.

DESCRIPTION OF THE EMBODIMENTS

In the following description, an MFP (multifunction peripheral) serves as an example of an image processing apparatus.

Figure 1A:
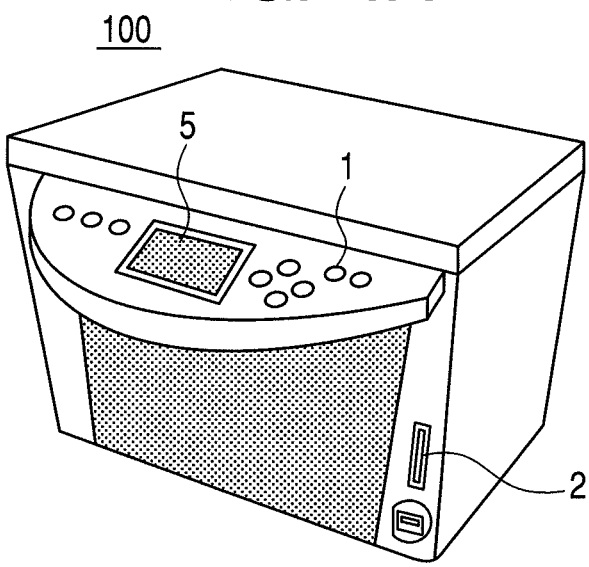
FIG. 1A depicts an appearance of an MFP 100 as an embodiment of the present invention.
Figure 1B:
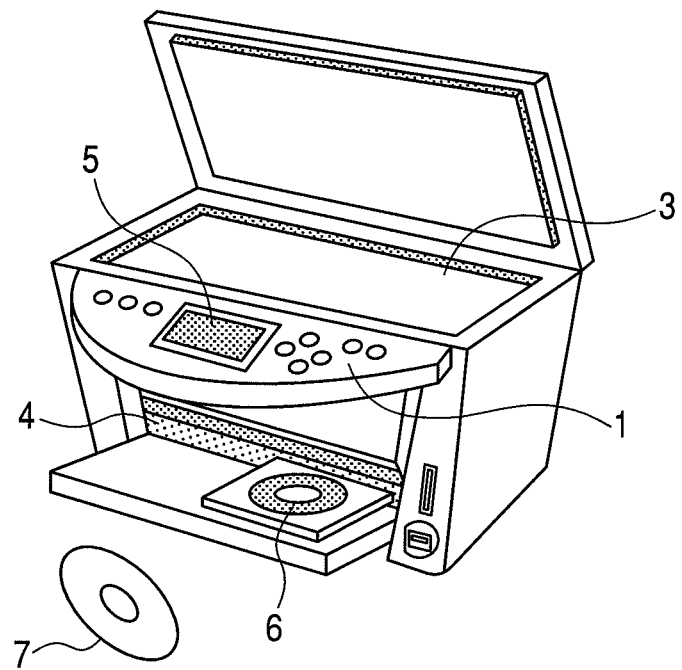
FIG. 1B depicts an opened state of various opening and closing units of the MFP 100 shown in FIG. 1A.

FIG. 1A depicts an appearance of an MFP 100 as an embodiment of the present invention. FIG. 1B depicts an opened state of various opening and closing units of the MFP 100 shown in FIG. 1A. The MFP 100 includes an operation unit 1, a card interface 2, a reading unit 3, a recording unit 4, a display unit 5, and a DVD inserting unit 6. A DVD 7 is a DVD as an object of label printing.

FIG. 2 is a block diagram of a configuration of the MFP 100. The same configurations as in FIG. 1 are designated with the same reference numerals. A CPU 10 is a control unit that controls the entire MFP. A ROM 11 stores various programs executed by the CPU 10. A RAM 12 is a work memory for the CPU 10 to execute the programs and is a memory for temporarily storing image data when the image data is output or input.

A non-volatile RAM 13 is a battery backup SRAM or the like and stores data and the like specific to the MFP 100. An image processing unit 14 executes various image processing.

Examples of the image processing includes detecting a scene of moving images, determining a representative image from the scene, analyzing an image, compressing image data, expanding image data, correcting an image, converting a color, converting image data to print data, and the like. The print data obtained by the image processing is stored in the RAM 12. If the print data stored in the RAM 12 reaches a predetermined amount required for recording by the recording unit 4, the recording unit 4 starts a recording operation.

The user operates the operation unit 1, which issues an instruction to the CPU 10 according to the operation. For example, the operation unit 1 includes a direct picture printing start key, a black and white copy start key for black and white copying, and a color copy start key for color copying for the user to select image data stored in the storage medium and start recording. The operation unit 1 also includes a mode key for specifying a mode of the copy resolution and the image quality, a stop key for stopping the copy operation, a numeric keypad and a registration key for inputting the number of extracted scenes and the number of copies, and a cursor key for specifying a unit for selecting an image file to be printed. The CPU 10 detects pressing of the keys and controls the units according to the pressing.

An external storage medium such as a memory card is mounted on the card interface 2, and the card interface 2 reads data stored in the storage medium. When a memory card storing therein moving images picked up by a digital video camera is inserted, the card interface 2 reads image data of moving images and still images according to a predetermined operation of the operation unit 1. The reading unit 3 includes a CCD as a reading sensor, and the CCD reads a document and outputs red (R), green (G), and blue (B) analog luminance data as image data. A contact image sensor (CIS) may be used as a reading sensor in place of the CCD. The recording unit 4 is constituted by an ink-jet type ink jet head, a general IC, etc. The CPU 10 controls the recording unit 4 to read recorded data stored in the RAM 12 and prints and outputs the recorded data as a hard copy. The display unit 5 is constituted by an LED (light emitting diode), an LCD (liquid crystal display), etc. The display unit 5 displays various input operations by the user, an operational condition of the MFP 100, a status condition, image data read by the card interface 2, an image such as a representative image determined by the image processing unit 14, and the like. The DVD inserting unit 6 inserts the DVD 7 to be printed into the MFP 100. The DVD inserting unit 6 can insert not only the DVD, but also a circular medium such as a CD-R/RW and a DVD±RW.

Figure 3:
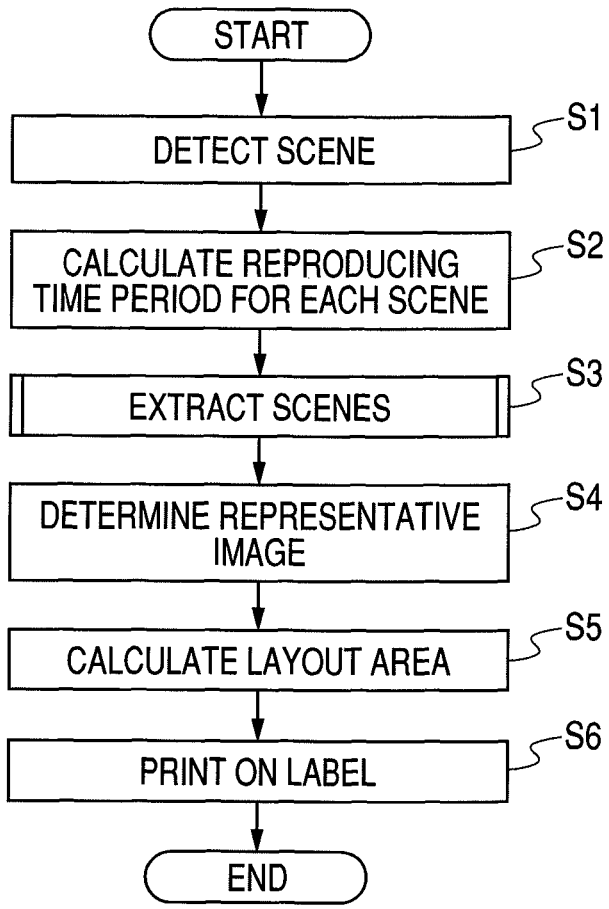
FIG. 3 is a flow chart of an operation of printing moving images recorded in a memory card on a label of a DVD 7.

An operation of printing moving images recorded in a memory card on the label of the DVD 7 will be described in an embodiment. FIG. 3 is a flow chart of an operation of printing moving images recorded in a memory card on the label of the DVD 7. The ROM 11 stores a program for executing the flow chart, and the program is executed by the control of the CPU 10. In S1, the image processing unit 14 is controlled to detect scenes from the moving images recorded in a memory card inserted into the card interface 2. Although the detection method of the scenes will not be described herein, a method as described in Japanese Patent No. 2,695,415 can be used. In S2, a reproducing time period of each of the detected scenes is calculated. The recording capacity of the scenes may be calculated in place of the reproducing time period of the scenes. In S3, scenes are extracted. More specifically, a predetermined number of scenes are selected in length order of the reproducing time period of the detected scenes. In S4, a representative image of each of the extracted scenes is determined. The representative image to be determined is arbitrary. In S5, areas for the representative images corresponding to the scenes to be laid out according to the reproducing time periods of the scenes and the area of the label of the DVD are calculated. In S6, the representative images are printed on the label of the DVD 7 as a print object that is inserted into the DVD inserting unit 6 of the MFP 100.

Figure 4:
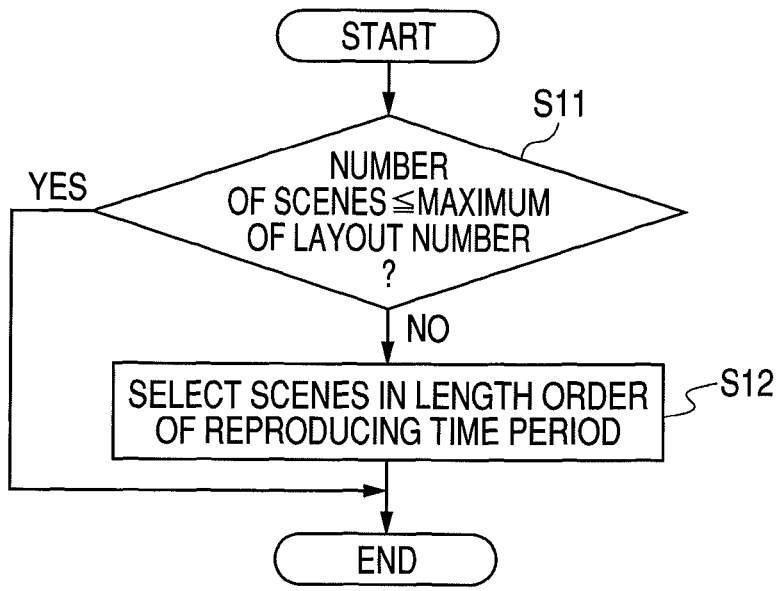
FIG. 4 is a flow chart of an operation of extracting scenes.

Details of the operation of extracting the scenes in S3 of the flow chart shown in FIG. 3 will be described. FIG. 4 is a flow chart of an operation of extracting scenes. In S11, whether the number of the selected scenes is equal to or smaller than a predetermined maximum of layout number is determined. If the number of the selected scenes is determined to be equal to or smaller than the maximum of layout number, all scenes will be laid out. Therefore, there is no need to select (extract) scenes, and the operation for extracting the scenes is terminated. If the number of the selected scenes is determined to be greater than the maximum of layout number (predetermined number of scenes) in S11, scenes are selected in length order of the reproducing time period in S12. Thus, the scenes are extracted for the maximum of layout number in length order of the reproducing time period. Although the predetermined maximum of layout number is a criterion in the present embodiment, the user may specify the number of scenes to be laid out through the operation unit 1. The display unit 5 may reproduce the detected scenes, and the user may manually select scenes to be laid out through the operation unit 1.

FIG. 5 depicts an example of laying out representative images of the scenes on the label of the DVD 7. Scene IDs SN1 to SN4 are IDs provided to the extracted scenes, and a total of four scenes are detected in the example shown in FIG. 5. Scene reproducing time periods T1 to T4 indicate reproducing time periods of the scenes. The reproducing time period T1 of the scene of the scene ID SN1 is 40 seconds, and the reproducing time period T2 of the scene of the scene ID SN2 is 30 seconds. The reproducing time period T3 of the scene of the scene ID SN3 is 20 seconds, and the reproducing time period T4 of the scene of the scene ID SN4 is 10 seconds.

Angles for laying out representative images I1, I2, I3, and I4 on the label of the DVD 7 are calculated based on the reproducing time periods of the detected scenes. The proportion of the reproducing time periods of the scenes in the example is T1:T2:T3:T4=40:30:20:10=4:3:2:1. The angles for printing the representative images I1, I2, I3, and I4 of the scene ID SN1 are θ1, θ2, θ3, and θ4, respectively. The angles to be allocated are as follows.

$$\theta 1 = 360° \times (4 \div (4+3+2+1)) = 144°$$

$$\theta 2 = 360° \times (3 \div (4+3+2+1)) = 108°$$

$$\theta 3 = 360° \times (2 \div (4+3+2+1)) = 72°$$

$$\theta 4 = 360° \times (1 \div (4+3+2+1)) = 36°$$

The representative images I1 to I4 of the scenes are converted to a fan shape based on the calculated angles and are laid out clockwise in length order of the reproducing time period. Although the angles for laying out the representative images I1 to I4 are calculated based on the reproducing time period of the scenes in the description, the angles for laying out the representative images may be calculated based on the recording capacity of the scenes instead of the reproducing time period. Although the representative images are laid out clockwise in length order of the reproducing time period in the description, there is no need to limit the order of arrangement to the above order but may be randomly laid out. The layout may be based on another criterion, and for example, the representative images may be laid out in the order from older photograph date.

Figure 6:
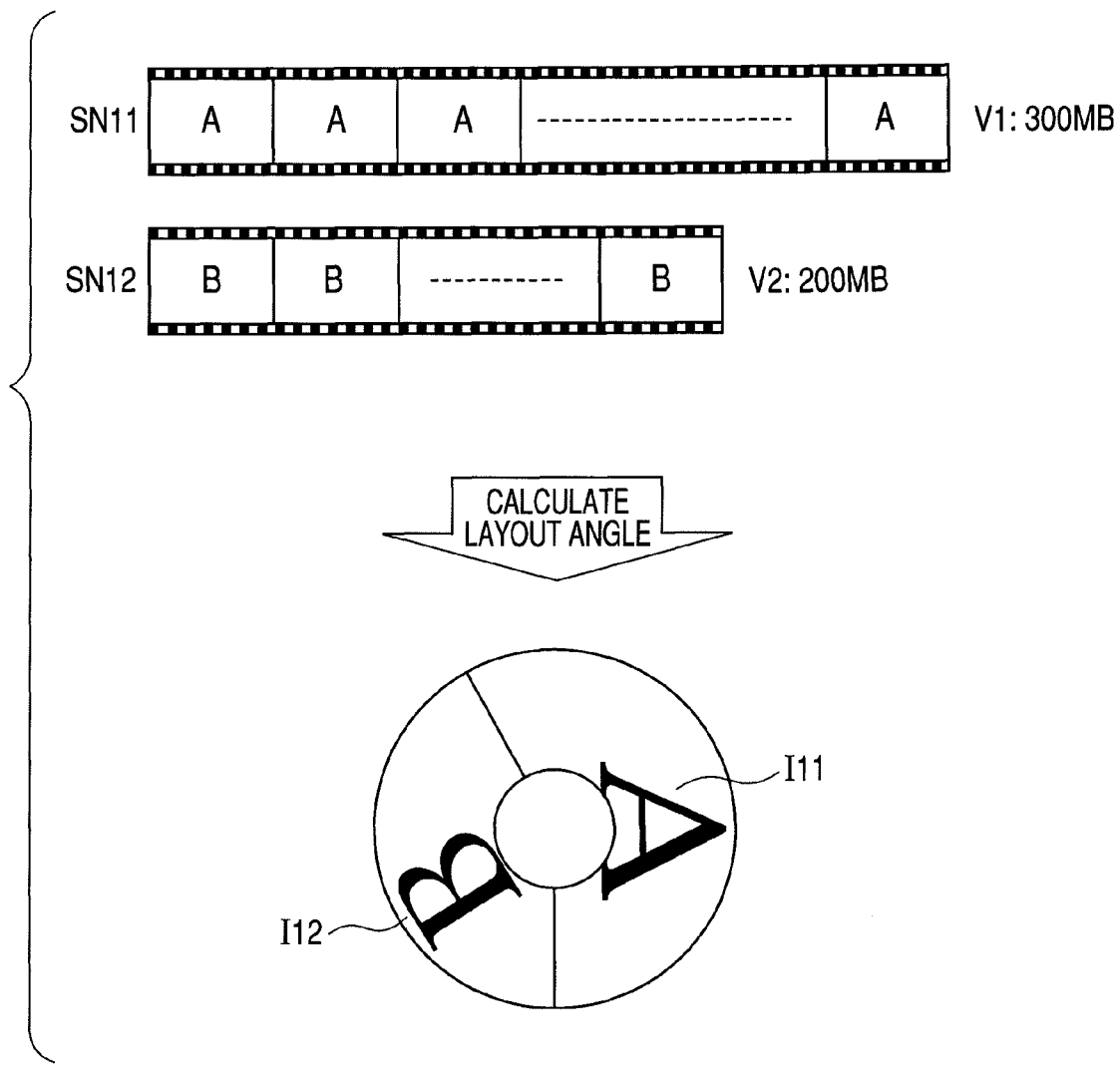
FIG. 6 depicts an example of laying out representative images on the label of the DVD 7 according to the recording capacity of the scenes.

FIG. 6 depicts an example of laying out the representative images on the label of the DVD 7 according to the recording capacity of the scenes. Scene IDs SN11 and SN12 are scene IDs after the extraction of the scenes, and a total of two scenes are detected. Scene recording capacities V1 and V2 are recording capacities of the extracted scenes. In the example, the recording capacity of the scene of the scene ID SN11 is 300 MB, and the recording capacity of the scene of the scene ID SN12 is 200 MB. Therefore, the proportion of the areas of the representative images of the scenes IDs SN11 and SN12 is 3:2. As a result of the process, the user can intuitively understand the length of the reproducing time period of the scene corresponding to each representative image from the size of the representative image printed on the label.

Although the label of the DVD is illustrated in the embodiment as a circular printing area, the embodiment can also be applied to a thing other than the label of the DVD as long as the medium to be printed is circular. Therefore, the images may be printed on a circular medium such as a CD-R/RW and a DVD±R/RW.

Although an MFP executes the processes in the example of the present embodiment, the present invention is not limited to this. An image processing apparatus that causes a printing apparatus of a PC (personal computer) or the like may also execute the processes. In that case, a recording medium recording program codes for realizing the functions of the embodiment is supplied to a system or an apparatus, and a computer (or CPU or MPU) of the system or the apparatus executes the program codes to attain the functions. In that case, the program codes read from the recording medium realize the functions of the embodiment, and the recording medium storing the program codes constitute the present invention. Examples of the recording medium for supplying the program codes include a hard disk, a CD-ROM, a CD-R, a non-volatile memory card, a ROM, and a DVD. The objects of the present invention are also attained when an operation system (OS) or the like operated on a computer executes part or all of the actual processes based on instructions of the program codes, and the processes realize the functions of the embodiment. The objects of the present invention are also attained when the program codes for realizing the functions of the embodiment are written in a memory included in a function expansion board inserted into the computer or a function expansion unit connected to the computer. In that case, a CPU or the like included in the function expansion board or the function expansion unit executes part or all of the actual processes based on instructions of the program codes, and the processes realize the functions of the embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-121473, filed May 7, 2008, which is hereby incorporated by reference herein in its entirety.

What is claimed is:

1. A print control apparatus, comprising:
a specifying unit configured to specify scenes included in moving images stored in a storage medium;
an extracting unit configured to extract still images, to be printed as an image by a print apparatus on a predetermined printing area of the storage medium, respectively from the scenes specified by said specifying unit;
an acquiring unit configured to acquire time values respectively corresponding to the scenes specified by said specifying unit;
an allocating unit configured to allocate the predetermined printing area to the scenes for printing each of the still images extracted by said extracting unit such that a ratio of size values respectively corresponding to parts allocated to the scenes is equal to a ratio of the time values acquired by said acquiring unit, wherein each of the parts of the predetermined printing area is individually allocated to each of the scenes; and
a print control unit configured to cause the printing apparatus to print, on the predetermined printing area, the still images respectively on the parts allocated to the scenes by said allocating unit.

2. The print control apparatus according to claim 1, wherein when said specifying unit specifies more than a predetermined number of scenes, said extracting unit extracts no more than the predetermined number of still images from the specified scenes.

3. The print control apparatus according to claim 2, wherein when said specifying unit specifies more than a predetermined number of scenes, said extracting unit extracts the predetermined number of still images from the specified scenes in order of time value.

4. The print control apparatus according to claim 1, wherein said allocating unit allocates the predetermined printing area on a circular storage medium.

5. The print control apparatus according to claim 4, wherein said allocating unit determines the part of the predetermined printing area allocated to one scene in terms of a central angle.

6. The print control apparatus according to claim 1, wherein said print control unit causes the printing apparatus to print each of the still images in a size equal to the size of the part of the predetermined printing area allocated to the scene from which the still image is extracted.

7. A print control method, comprising the steps of:
specifying scenes included in moving images stored in a storage medium;
extracting still images, to be printed as an image by a print apparatus on a predetermined printing area of the storage medium, respectively from the scenes specified in said specifying step;
acquiring time values respectively corresponding to the scenes specified in said specifying step;
allocating the predetermined printing area to the scenes for printing each of the still images extracted in said extracting step such that a ratio of size values respectively corresponding to parts allocated to the scenes is equal to a ratio of the time values acquired in said acquiring step, wherein each of the parts of the predetermined printing area is individually allocated to each of the scenes; and
causing the printing apparatus to print, on the predetermined printing area, the still images respectively on the parts allocated to the scenes in said allocating step.

8. The print control method according to claim 7, wherein when said specifying step includes specifying more than a predetermined number of scenes, said extracting step includes extracting no more than the predetermined number of still images from the specified scenes.

9. The print control method according to claim 8, wherein when said specifying step includes specifying more than a predetermined number of scenes, said extracting step includes extracting the predetermined number of still images from the specified scenes in order of time value.

10. The print control method according to claim 9, wherein said allocating step includes allocating the predetermined printing area on a circular storage medium.

11. The print control method according to claim 10, wherein said allocating step includes determining the part of the predetermined printing area allocated to one scene in terms of a central angle.

12. The print control method according to claim 7, wherein said causing step includes causing the printing apparatus to print each of the still images in a size equal to the size of the part of the predetermined printing area allocated to the scene from which the still image is extracted.

13. A non-transitory computer-readable storage medium storing an executable program for causing a computer to execute a print control method, said method comprising the steps of:

specifying scenes included in moving images stored in a storage medium;

extracting still images, to be printed as an image by a print apparatus on a predetermined printing area of the storage medium, respectively from the scenes specified in said specifying step;

acquiring time values respectively corresponding to the scenes specified in said specifying step;

allocating the predetermined printing area to the scenes for printing each of the still images extracted in said extracting step such that a ratio of size values respectively corresponding to parts allocated to the scenes is equal to a ratio of the time values acquired in said acquiring step, wherein each of the parts of the predetermined printing area is individually allocated to each of the scenes; and causing the printing apparatus to print, on the predetermined printing area, the still images respectively on the parts allocated to the scenes in said allocating step.

14. The non-transitory, computer-readable storage medium according to claim 13, wherein when said specifying step includes specifying more than a predetermined number of scenes, said extracting step includes extracting no more than the predetermined number of still images from the specified scenes.

15. The non-transitory, computer-readable storage medium according to claim 14, wherein when said specifying step includes specifying more than a predetermined number of scenes, said extracting step includes extracting the predetermined number of still images from the specified scenes in order of time value.

16. The non-transitory, computer-readable storage medium according to claim 13, wherein said allocating step includes allocating the predetermined printing area on a circular storage medium.

17. The non-transitory, computer-readable storage medium according to claim 16, wherein said allocating step includes determining the part of the predetermined printing area allocated to one scene in terms of a central angle.

18. The non-transitory, computer-readable storage medium according to claim 13, wherein said causing step includes causing the printing apparatus to print each of the still images in a size equal to the size of the part of the predetermined printing area allocated to the scene from which the still image is extracted.

* * * * *